(12) United States Patent
Kamito et al.

(10) Patent No.: US 9,185,467 B2
(45) Date of Patent: Nov. 10, 2015

(54) RECEPTION APPARATUS, RECEPTION METHOD, AND RECEPTION PROGRAM

(75) Inventors: Takafumi Kamito, Fukuoka (JP); Hiroshi Ohtsuru, Fukuoka (JP); Iwao Hashizume, Fukuoka (JP); Masaru Nishida, Fukuoka (JP); Takato Ohashi, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 695 days.

(21) Appl. No.: 12/967,647

(22) Filed: Dec. 14, 2010

(65) Prior Publication Data

US 2011/0149999 A1 Jun. 23, 2011

(30) Foreign Application Priority Data

Dec. 17, 2009 (JP) ................................. 2009-286796

(51) Int. Cl.
*H04J 3/06* (2006.01)
*H04N 21/6437* (2011.01)
*H04N 21/43* (2011.01)
*H04L 29/06* (2006.01)

(52) U.S. Cl.
CPC .......... *H04N 21/6437* (2013.01); *H04L 65/607* (2013.01); *H04N 21/4305* (2013.01)
USPC ........................................................ 370/516

(58) Field of Classification Search
CPC ........... H04N 21/6437; H04N 21/4305; H04L 65/607
USPC ........................................................ 370/516
See application file for complete search history.

(56) References Cited

U.S. PATENT DOCUMENTS

| | | | | |
|---|---|---|---|---|
| 5,901,149 | A * | 5/1999 | Itakura et al. | 370/468 |
| 6,072,369 | A * | 6/2000 | Dhong et al. | 331/17 |
| 6,137,326 | A * | 10/2000 | Ogawa | 327/156 |
| 6,208,643 | B1 * | 3/2001 | Dieterich et al. | 370/389 |
| 6,567,409 | B1 | 5/2003 | Tozaki et al. | |
| 6,973,258 | B1 * | 12/2005 | Yoo et al. | 386/330 |
| 2002/0024970 | A1 * | 2/2002 | Amaral et al. | 370/468 |
| 2003/0215213 | A1 * | 11/2003 | Sakamoto | 386/46 |
| 2006/0007960 | A1 * | 1/2006 | Liu et al. | 370/503 |

(Continued)

FOREIGN PATENT DOCUMENTS

| | | |
|---|---|---|
| EP | 1613016 | 1/2006 |
| EP | 1613016 A1 * | 1/2006 |

(Continued)

OTHER PUBLICATIONS

Extended European Search Report issued on Mar. 25, 2011 in corresponding European Application No. EP 10195624 (6 pages).

(Continued)

*Primary Examiner* — Steven H Nguyen
(74) *Attorney, Agent, or Firm* — Staas & Halsey LLP

(57) ABSTRACT

A reception apparatus is configured to receive data including a plurality of packets each of which has information on a time point when the packet is generated; to extract a terminal packet which is a packet included in the data received and which has information on a time point which is nearest to a current time point; and to control an operation clock by comparing the information on the time point included in the terminal packet with information on an elapsed time obtained by adding information on a time point, which is included in a terminal packet of preceding data, to an elapsed time from when the preceding data is received to the current time point.

7 Claims, 10 Drawing Sheets

(56) References Cited

U.S. PATENT DOCUMENTS

| | | | |
|---|---|---|---|
| 2006/0088273 A1* | 4/2006 | Lee et al. | 386/1 |
| 2006/0136768 A1* | 6/2006 | Liu et al. | 713/400 |
| 2007/0263985 A1* | 11/2007 | Ikeda et al. | 386/96 |
| 2008/0056666 A1* | 3/2008 | Mio | 386/65 |
| 2008/0089660 A1* | 4/2008 | Hashimoto et al. | 386/52 |
| 2008/0259962 A1* | 10/2008 | Mori et al. | 370/498 |
| 2009/0067535 A1* | 3/2009 | Koudo et al. | 375/295 |
| 2009/0116814 A1* | 5/2009 | Morohashi et al. | 386/65 |
| 2009/0122714 A1* | 5/2009 | Kato | 370/252 |

FOREIGN PATENT DOCUMENTS

| | | |
|---|---|---|
| JP | 09-307865 | 11/1997 |
| JP | 11-298891 | 10/1999 |
| JP | 2003-218842 | 7/2003 |

OTHER PUBLICATIONS

ETSI TS 1XXXXX V 0.0.5, "DVB", 17AANCIENNE Route 1218 Grand Saconnex, Geneva Switzerland, Jan. 20, 2004, XP040397437, pp. 74-76.

D. Hoffman, G. Fernando, Sun Microsystems et al; "RTP Payload Format for MPEG1/MPEG2 Video; rfc2250, txt", IETF Standard, Internet Engineering Task Force, IETF, CH, Jan. 1, 1998, XP015008034, ISSN: 0000-0003.

European Office Action mailed Nov. 7, 2013 in corresponding European Application No. 10195624.1.

Summons to attend oral proceedings pursuant to Rule 115(1) EPC, dated Feb. 11, 2015, in corresponding European Application No. 10195624.1 (3 pp.).

The minutes of the oral proceedings dated Jul. 27, 2015 in corresponding European Patent Application No. 10 195 624.1, 8 pages.

\* cited by examiner

RECEPTION APPARATUS, RECEPTION METHOD, AND RECEPTION PROGRAM

CROSS-REFERENCE TO RELATED APPLICATIONS

This application is based upon and claims the benefit of priority of the prior Japanese Patent Application No. 2009-286796, filed on Dec. 17, 2009, the entire contents of which are incorporated herein by reference.

FIELD

The present invention relates to a reception apparatus, a reception method, and a reception program.

BACKGROUND

In general, a moving-image delivery system which delivers moving images through a network has been used. Such a moving-image delivery system conforms to a certain standard such as MPEG (Moving Picture Expert Group) or H.264/AVC (Advanced Video Coding), and includes a transmission apparatus which delivers moving images and a reception apparatus which receives moving images.

In the moving-image delivery system, the transmission apparatus encodes moving-image data to be delivered so as to generate a PS (Program Stream) pack from the encoded data. The transmission apparatus transmits a PS including a plurality of PS packs to the reception apparatus through a network. The reception apparatus obtains moving-image data by performing a decoding process or the like on the PS supplied from the transmission apparatus. Thereafter, the reception apparatus outputs the obtained moving-image data to a display, a speaker, or the like. Note that the transmission apparatus may generate a TS (Transport Stream) packet instead of the PS pack and deliver a TS including TS packets to the reception apparatus.

The transmission apparatus and the reception apparatus described above perform a process of matching clock speeds of both the apparatuses with each other using a PCR (Program Clock Reference). This process will be described with reference to FIG. 9. FIG. 9 is a diagram illustrating a clock-speed control process in the related art. As shown in FIG. 9, a transmission apparatus 910 of the related art stores an SCR (System Clock Reference) representing information on a time point when a PS pack is generated in a pack header of the PS pack when generating the PS pack. Then, the transmission apparatus 910 shown in FIG. 9 generates a PS pack 91P and transmits the generated PS pack 91P to a reception apparatus 920. Furthermore, after a period of time t11 is elapsed after the PS pack 91P is generated, the transmission apparatus 910 generates a PS pack 92P and transmits the PS pack 92P to the reception apparatus 920. After a period of time t12 is elapsed after the PS pack 92P is generated, the transmission apparatus 910 generates a PS pack 93P and transmits the PS pack 93P to the reception apparatus 920.

Thereafter, the reception apparatus 920 shown in FIG. 9 generates a PCR in accordance with the SCR included in the PS pack 91P when receiving the PS pack 91P. It is assumed that the reception apparatus 920 generates a PCR having a PCR value of P1. In this case, the reception apparatus 920 sets the PCR value of P1 as an STC (System Time Clock) of the reception apparatus 920. Subsequently, it is assumed that the reception apparatus 920 received the PS pack 92P after a period of time t21 is elapsed after the PS pack 91P is received.

In this case, the reception apparatus 920 generates a PCR having a PCR value of P2 in accordance with an SCR included in the PS pack 92P.

Then, the reception apparatus 920 compares the PCR value of P2 with the STC value of the reception apparatus 920. Since the PCR value of P2 represents information on a time point when the transmission apparatus 910 generates the PS pack 92P, the PCR value of P2 is obtained by adding the PCR value of P1 to the period of time t11 (P1+t11). Furthermore, since the STC value of the reception apparatus 920 represents information on a time point when the PCR is generated in accordance with the PS pack 92P, the STC value is obtained by adding the PCR value of P1 to the period of time t21 (P1+t21). Specifically, the reception apparatus 920 compares the elapsed period of time t11 of the transmission apparatus 910 with the elapsed period of time t21 of the reception apparatus 920. As a result of the comparison, when the PCR value of P2 is larger than the STC value, the reception apparatus 920 determines that a clock speed of the reception apparatus 920 is lower than a reference clock speed of the transmission apparatus 910 and makes the clock speed of the reception apparatus 920 be increased. On the other hand, when the PCR value of P2 is smaller than the STC value, the reception apparatus 920 determines that the clock speed of the reception apparatus 920 is higher than the reference clock speed of the transmission apparatus 910 and makes the clock speed of the reception apparatus 920 be reduced.

Furthermore, when receiving the PS pack 93P after the period of time t22 is elapsed after the PS pack 92P is received, the reception apparatus 920 shown in FIG. 9 generates a PCR having a PCR value of P3 in accordance with an SCR included in the PS pack 93P. Then, the reception apparatus 920 compares the PCR value of P3 with the STC value of the reception apparatus 920 so as to control the clock speed of the reception apparatus 920.

This method is disclosed in Japanese Laid-open Patent Publication No. 9-307865, for example.

Furthermore, in the related art, a packet arrival time may be shifted due to a network jitter or the like. When a large shift is generated, a difference between a generation time of the transmission apparatus and an arrival time of the reception apparatus becomes considerably large, and accordingly, time is not reliably controlled. To address this problem, as a countermeasure, a threshold value is set for a result of a difference obtained from a comparison between the PCR value and the STC value. In this countermeasure, when the result is larger than the threshold value, the PCR is not used.

Such a countermeasure is disclosed in Japanese Laid-open Patent Publication No. 2003-218842, for example.

SUMMARY

A reception apparatus includes: a reception unit configured to receive data including a plurality of packets each of which has information on a time point when the packet is generated; an extraction unit configured to extract a terminal packet which is a packet included in the data received by the reception unit and which has information on a time point which is nearest to a current point; and a controller configured to control an operation clock by comparing the information on the time point included in the terminal packet extracted by the extraction unit with information on an elapsed time obtained by adding information on a time point included in a terminal packet of preceding data to an elapsed time of the reception apparatus from when the preceding data is received to the current time.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DETAILED DESCRIPTION OF EMBODIMENT(S)

First, a problem to be solved by the present invention will be described, and subsequently, embodiments of the present invention will be described.

In the moving-image delivery system according to "Background" described above, the clock speeds of the transmission apparatus and reception apparatus may not be matched with each other since time intervals for generation of PS packs of the transmission apparatus and time intervals for generation of PCRs are different from each other when delivery of moving images is performed in accordance with an RTP (Real Time Protocol).

Figure 10:
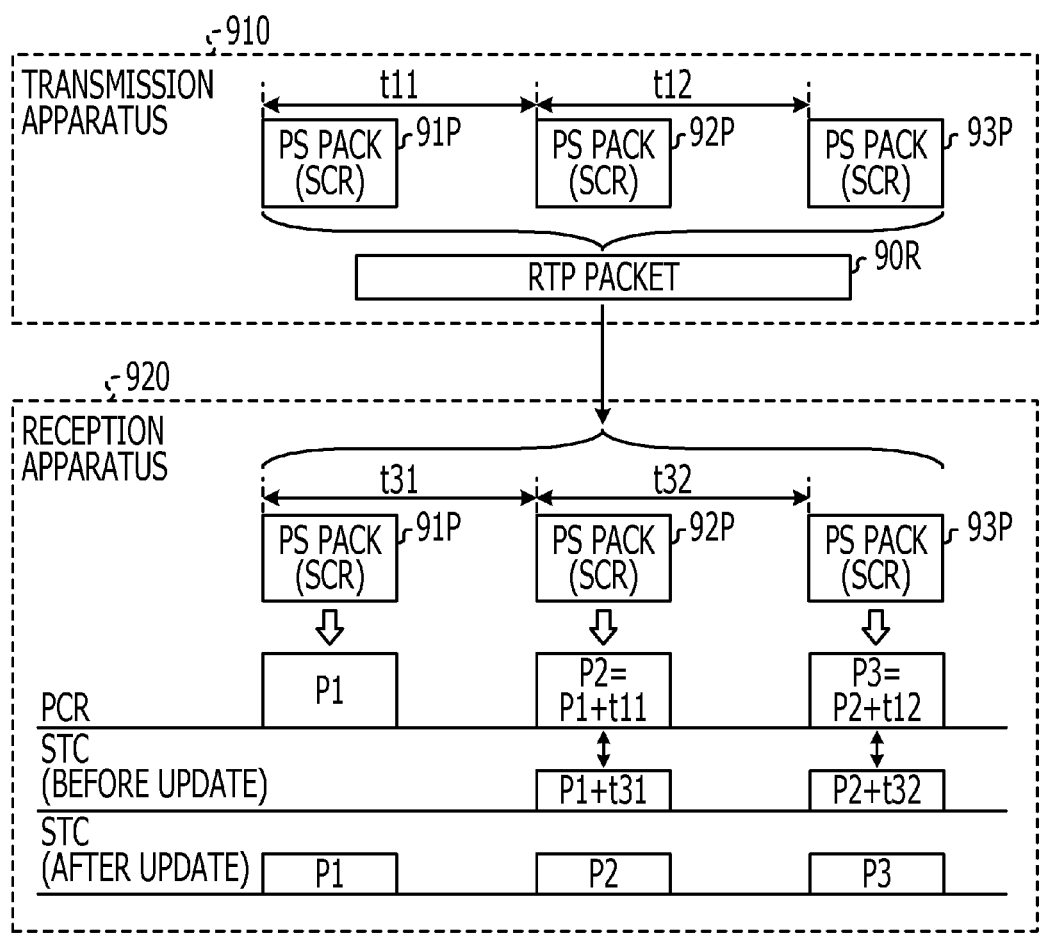
FIG. 10 is a diagram illustrating a clock-speed control process performed by a moving-image delivery system which delivers moving images in accordance with an RTP.

This problem will be described in detail with reference to FIG. 10. FIG. 10 is a diagram illustrating a clock-speed control process performed by the moving-image delivery system which delivers moving images in accordance with the RTP. As shown in FIG. 10, the transmission apparatus 910 in the related art generates an RTP packet including a plurality of PS packs when delivering a moving image in accordance with the RTP. Specifically, the transmission apparatus 910 successively generates the PS packs. When a total size of a plurality of generated PS packs satisfies an RTP packet size, an RTP packet including the PS packets is generated. In an example shown in FIG. 10, the transmission apparatus 910 generates a PS pack 91P, generates a PS pack 92P after a period of time t11 is elapsed, and further generates a PS pack 93P after a period of time t12 is elapsed. Since a total size of the generated PS packs 91P to 93P satisfies the RTP packet size, the transmission apparatus 910 generates an RTP packet 90R including the PS pack 91P to 93P. Note that each of the PS packs 91P to 93P includes an SCR representing information on a time point when a corresponding one of the PS packs 91P to 93P is generated.

Then, when receiving the RTP packet 90R from the transmission apparatus 910, the reception apparatus 920 divides the RTP packet 90R so as to generate PCRs in accordance with SCRs included in the PS packs 91P to 93P obtained through the division. In the example shown in FIG. 10, the reception apparatus 920 generates a PCR having a PCR value of P1 in accordance with the SCR included in the PS pack 91P and sets the generated PCR value P1 as an STC of itself. Subsequently, the reception apparatus 920 generates a PCR having a PCR value of P2 in accordance with the SCR included in the PS pack 92P and compares the PCR value of P2 with the STC value of itself. In the example shown in FIG. 10, the reception apparatus 920 performs a PCR generation process on the PS pack 92P after a period of time t31 is elapsed after the PCR generation process is performed on the PS pack 91P. That is, the reception apparatus 920 compares the PCR value of P2 (P1+t11) with an STC value (P1+t31).

Furthermore, the reception apparatus 920 generates a PCR having a PCR value of P3 in accordance with the SCR included in the PS pack 93P and compares the PCR value of P3 with the STC value of itself. In the example shown in FIG. 10, the reception apparatus 920 performs the PCR generation process on the PS pack 93P after a period of time t32 is elapsed after the PCR generation process is performed on the PS pack 92P. That is, the reception apparatus 920 compares a PCR value of P3 (P2+t12) with an STC value (P2+t32).

Figure 9:
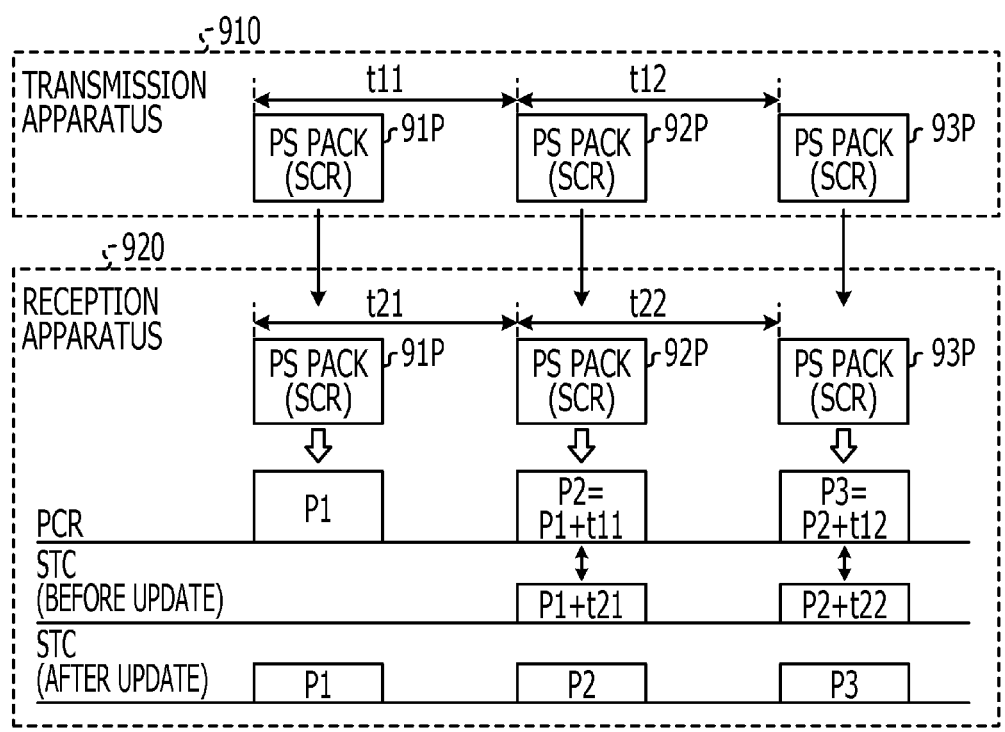
FIG. 9 is a diagram illustrating a clock-speed control process in the related art.

Here, the comparison process performed by the reception apparatus 920 shown in FIG. 10 will be described. The reception apparatus 920 normally compares the time intervals for generation of PS packs in the transmission apparatus 910 with the time intervals for generation of PCRs in the reception apparatus 920 as shown in the example of FIG. 9 so as to compare the relationship between elapsed times of both the apparatuses. Since the transmission apparatus 910 shown in FIG. 9 transmits each of the PS packs immediately after generating the PS pack, the reception apparatus 920 can appropriately compares the elapsed times of both the apparatuses with each other to obtain the relationship between the elapsed times.

However, as shown in the example of FIG. 10, in the system in which the transmission apparatus 910 is brought to a waiting state after generating a PS pack including an SCR, the reception apparatus 920 may not determine the relationship between elapsed times of both the apparatuses. Specifically, the transmission apparatus 910 shown in FIG. 10 waits until a total size of the generated PS packs has reached the RTP packet size. On the other hand, the reception apparatus 920 shown in FIG. 10 successively performs a PCR generation process on the PS packs 91P to 93P obtained after the division when receiving the RTP packet 90R. That is, the time intervals for generation of the PS packs in the transmission apparatus 910 could become totally different from the time intervals for generation of the PCRs in the reception apparatus 920. Therefore, even when the clock speeds of the transmission apparatus 910 and the reception apparatus 920 are equal to each other, the reception apparatus 920 may determine that the elapsed time of the transmission apparatus 910 is different from the elapsed time of the reception apparatus 920.

As described above, in the moving-image delivery system which delivers a moving image using a packet including a plurality of time information blocks, the clock speeds of the transmission apparatuses and the reception apparatuses may not be matched with each other.

The present invention has been made in view of the above problem, and it is an object of an embodiment of the present invention to provide a reception apparatus capable of matching a clock speed thereof with a clock speed of a transmission apparatus, a reception method, and a reception program.

Embodiments of a reception apparatus, a reception method, and a reception program to be disclosed in this application will be described hereinafter with reference to the accompanying drawings.

First Embodiment

Figure 1:
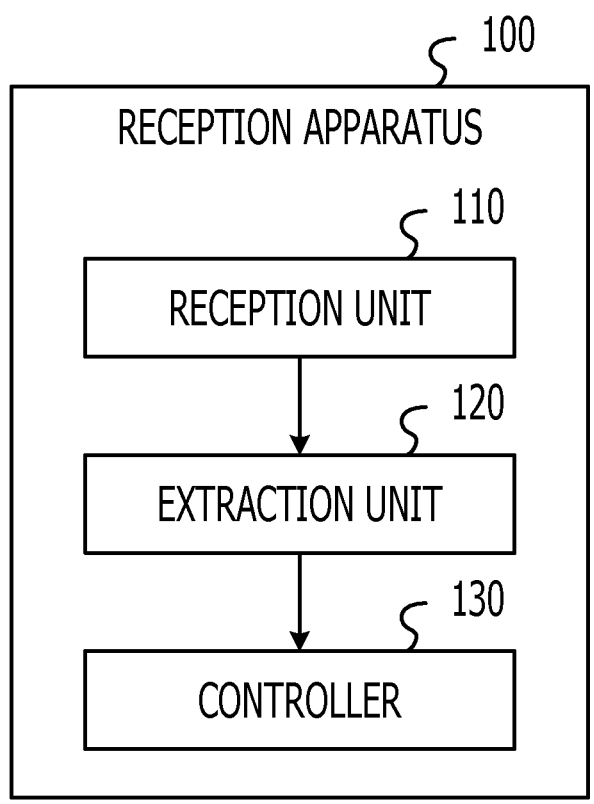
FIG. 1 is a block diagram illustrating a configuration of a reception apparatus according to a first embodiment.

A reception apparatus 100 according to a first embodiment will be described with reference to FIG. 1. FIG. 1 is a block diagram illustrating a configuration of the reception apparatus 100 according to the first embodiment. The reception apparatus 100 receives a moving image by communicating with a transmission apparatus which delivers moving images, for example. As shown in FIG. 1, the reception apparatus 100 of the first embodiment includes a reception unit 110, an extraction unit 120, and a controller 130.

The reception unit 110 receives data including a plurality of packets each of which has information on a time point when the packet is generated at the transmission apparatus. The extraction unit 120 extracts one of the packets included in the data received by the reception unit 110 which has information on a time point which is nearest to a current time (hereinafter referred to as a "terminal packet").

The controller 130 obtains time-elapsed information obtained by adding time information included in a terminal packet previously received to a period of time elapsed from a time point when the previous data is received to a current time. Furthermore, the controller 130 compares the obtained time-elapsed information with the time information included in the terminal packet extracted by the extraction unit 120 to thereby control an operation clock of the reception apparatus 100.

As described above, when receiving the data including the plurality of packets each of which has time information, the reception apparatus 100 according to the first embodiment controls the operation clock of itself using the terminal packet of the received data.

In general, a transmission apparatus transmits data including a terminal packet immediately after generating the terminal packet. Alternatively, even when a predetermined process is to be performed after generating a terminal packet, the transmission apparatus generally transmits data including the terminal packet after a certain period of time is elapsed after the terminal packet is generated. Therefore, the reception apparatus 100 according to the first embodiment can determine the relationship between an elapsed time of the transmission apparatus and an elapsed time of the reception apparatus 100. Consequently, even when receiving data including a plurality of packets each of which has time information, the reception apparatus 100 according to the first embodiment can match a clock speed of itself with a clock speed of the transmission apparatus.

Second Embodiment

Next, the reception apparatus according to the first embodiment will be described using a concrete example. In a second embodiment, an example in which the reception apparatus described in the first embodiment is applied to a moving-image delivery system which delivers moving images in accordance with the RTP will be described. Note that, in the second embodiment, an example in which the reception apparatus receives an RTP packet including a plurality of PS packs will be described. However, the reception apparatus and the like disclosed in this application are not limited to the example described above, and may be applicable to a moving-image delivery system which delivers moving images using a packet including a plurality of time information blocks. For example, the reception apparatus and the like disclosed in this application is applicable in a case where the reception apparatus and the like receives an RTP packet including a plurality of TS packets.

[Example of Configuration of Moving-Image Delivery System in Second Embodiment]

Figure 2:
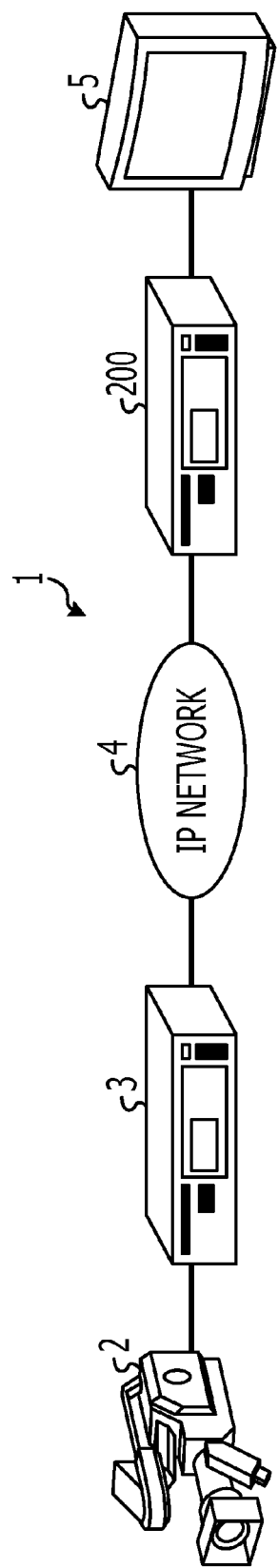
FIG. 2 is a diagram illustrating a configuration of a moving-image delivery system according to a second embodiment.

First, a configuration of a moving-image delivery system 1 according to the second embodiment will be described with reference to FIG. 2. FIG. 2 is a diagram illustrating a configuration of the moving-image delivery system 1 according to the second embodiment. The moving-image delivery system 1 delivers moving images in accordance with the RTP. As shown in FIG. 2, the moving-image delivery system 1 includes a camera 2, a transmission apparatus 3, a display apparatus 5, and a reception apparatus 200. The transmission apparatus 3 transmits and the reception apparatus 200 receives data through an IP network 4.

The camera 2 captures a moving image and outputs moving-image data to the transmission apparatus 3. The transmission apparatus 3 delivers the moving-image data. Specifically, the transmission apparatus 3 encodes the moving-image data supplied from the camera 2 so as to generate a PS pack. Then, the transmission apparatus 3 transmits an RTP packet including a plurality of PS packs to the reception apparatus 200 through the IP network 4.

The reception apparatus 200 performs a decoding process or the like on the RTP packet received from the transmission apparatus 3 through the IP network 4 so as to obtain moving-image data, and outputs the obtained moving-image data to the display apparatus 5. Furthermore, the reception apparatus 200 performs a process of matching a clock speed of itself with a clock speed of the transmission apparatus 3. Note that a configuration of the reception apparatus 200 will be described hereinafter with reference to FIG. 4. The display apparatus 5 serving as an output device outputs a moving image and includes a display and a speaker.

Figure 3:
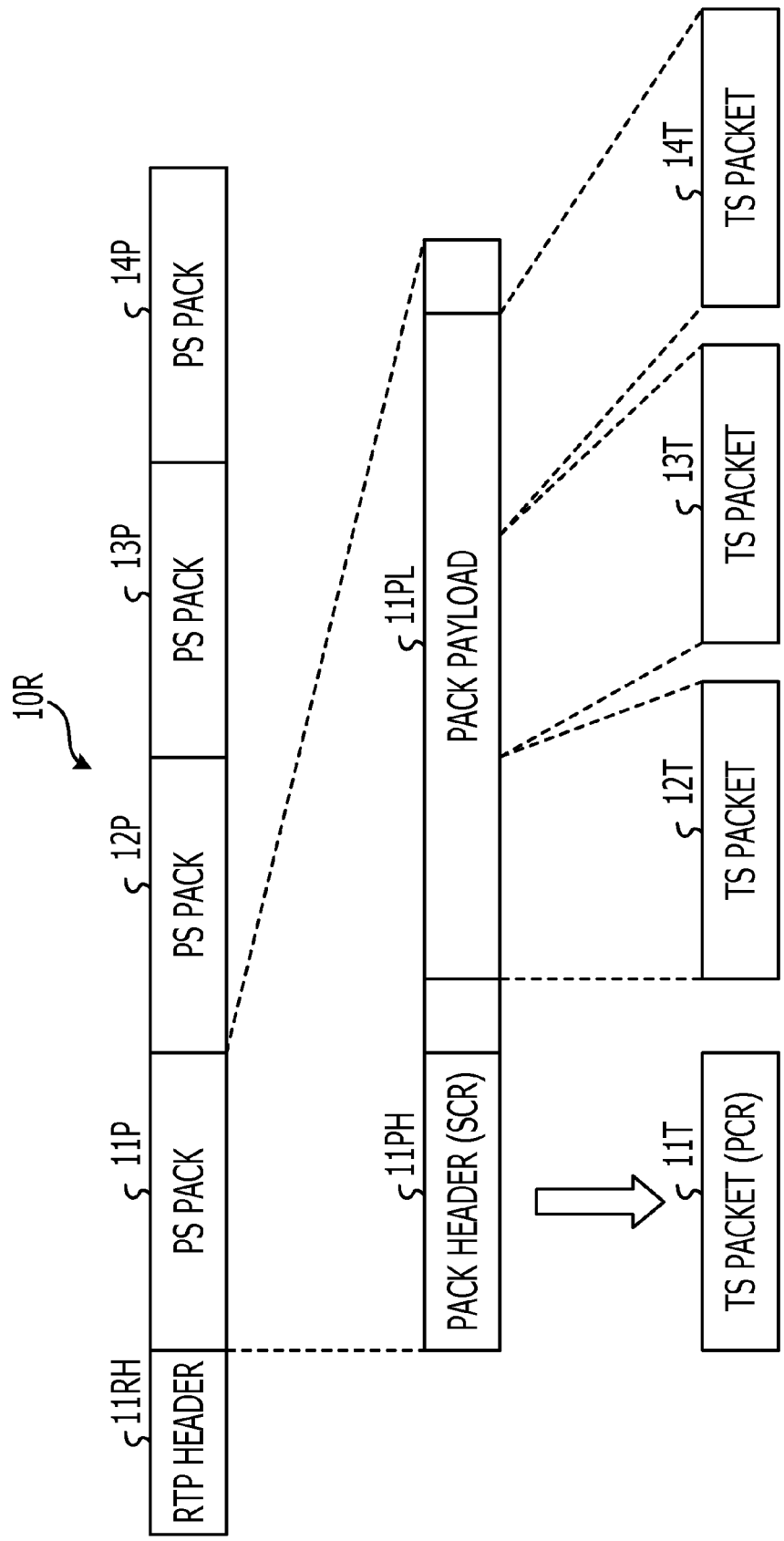
FIG. 3 is a diagram illustrating a format of an RTP packet.

Referring now to FIG. 3, a format of an RTP packet transmitted from the transmission apparatus 3 to the reception apparatus 200 will be described. FIG. 3 is a diagram illustrating a format of an RTP packet. As shown in FIG. 3, the RTP packet includes an RTP header and a plurality of PS packs. In the example shown in FIG. 3, an RTP packet 10R includes an RTP header 11RH and PS packs 11P to 14P. As shown in FIG. 3, the PS pack 11P includes a pack header 11PH and a pack payload 11PL. Similarly, each of the PS packs 12P to 14P includes a pack header and a pack payload. Such a pack header has a region which stores an SCR. The SCR serves as time information representing a current time and is represented by a counter value of 42 bits operated in 27 MHz, for example. Furthermore, such a pack payload has a region which stores encoded video data, encoded audio data, and the like.

When receiving the RTP packet 10R shown in FIG. 3, the reception apparatus 200 shown in FIG. 2 generates TS packets each of which includes a PCR in accordance with the SCRs stored in the pack headers of the PS packs. The PCR serves as time information representing a current time and is represented by to a counter value of 42 bits operated in 27 MHz, for example. The reception apparatus 200 further generates TS packets by dividing the pack payload included in each of the PS packs. In the example shown in FIG. 3, the reception apparatus 200 generates a TS packet 11T including a PCR in accordance with an SCR included in the pack header 11PH of the PS pack 11P. Furthermore, the reception apparatus 200 generates TS packets 12T to 14T by dividing the pack payload 11PL of the PS pack 11P.

[Configuration of Reception Apparatus in Second Embodiment]

Figure 4:
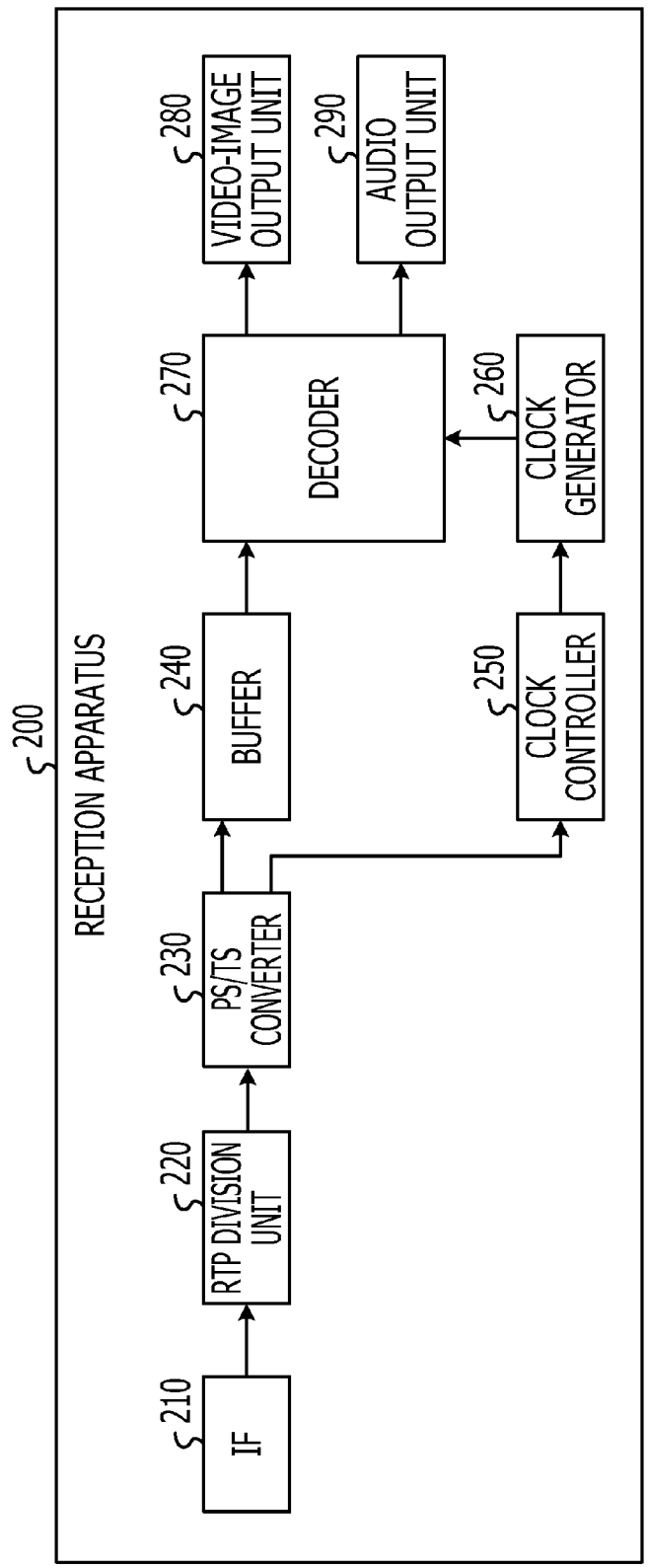
FIG. 4 is a block diagram illustrating a configuration of a reception apparatus according to a second embodiment.

Next, a configuration of the reception apparatus 200 shown in FIG. 2 will be described with reference to FIG. 4. FIG. 4 is a block diagram illustrating a configuration of the reception apparatus 200 according to the second embodiment. As shown in FIG. 4, the reception apparatus 200 includes an IF (Interface) 210, an RTP division unit 220, a PS/TS converter 230, a buffer 240, a clock controller 250, a clock generator 260, a decoder 270, a video-image output unit 280, and an audio output unit 290.

The IF 210 receives data from an external apparatus through the IP network 4. For example, the IF 210 receives an RTP packet transmitted from the transmission apparatus 3 through the IP network 4.

The RTP division unit 220 divides the RTP packet received by the IF 210. Specifically, the RTP division unit 220 deletes an RTP header from the RTP packet and divides the RTP packet into a plurality of PS packs. Then, the RTP division unit 220 outputs the PS packs obtained after the division to the PS/TS converter 230.

Furthermore, when one of the PS packs included in the RTP packet which has information on a time point which is nearest to a current time is to be output to the PS/TS converter 230, the RTP division unit 220 outputs information representing that the time point included in the information is nearest to the current time to the PS/TS converter 230. Note that, hereinafter, one of the PS packs included in the RTP packet which has information on a time point which is nearest to a current time may be referred to as a "terminal PS pack". In addition, information representing that a PS pack includes information on a time which is nearest to a current time may be referred to as "terminal information".

When receiving the RTP packet 10R shown in FIG. 3, for example, the RTP division unit 220 deletes the RTP header 11RH from the RTP packet 10R and divides the RTP packet 10R into the PS packs 11P to 14P. Thereafter, the RTP division unit 220 outputs the PS packs 11P to 14P obtained through the division to the PS/TS converter 230. Since the PS pack 14P corresponds to a terminal PS pack, the RTP division unit 220 outputs terminal information in addition to the PS pack 14P to the PS/TS converter 230.

The PS/TS converter 230 converts a PS pack supplied from the RTP division unit 220 into a TS packet. Specifically, the PS/TS converter 230 divides a pack payload included in a PS pack into TS packets each of which has a predetermined size to be stored in the buffer 240. Furthermore, when receiving a terminal PS pack from the RTP division unit 220, the PS/TS converter 230 generates a PCR. Thereafter, the PS/TS converter 230 outputs the generated PCR to the clock controller 250. Note that a configuration of the PS/TS converter 230 according to the second embodiment will be described hereinafter with reference to FIG. 5.

The buffer 240 serves as a storage device which stores various data. Specifically, the buffer 240 stores the TS packets output from the PS/TS converter 230. The TS packets stored in the buffer 240 are used by the decoder 270 which will be described hereinafter.

The clock controller 250 controls an operation clock of the reception apparatus 200. Specifically, the clock controller 250 controls a clock speed of the clock generator 260 which will be described below in accordance with the PCR supplied from the PS/TS converter 230 so that the clock speed of the clock generator 260 corresponds to the clock speed of the transmission apparatus 3. Note that an operation-clock control process performed by the clock controller 250 will be described hereinafter with reference to FIG. 6.

The clock generator 260 generates an operation clock for the decoder 270. Specifically, the clock generator 260 generates an operation clock for the decoder 270 in accordance with the clock speed controlled by the clock controller 250.

The decoder 270 reads the TS packets stored in the buffer 240 and performs a decoding process on the read TS packets. Here, the decoder 270 performs the decoding process in accordance with the operation clock generated by the clock generator 260.

The video-image output unit 280 outputs video image data decoded by the decoder 270 to a display apparatus not shown such as a display or a monitor. The audio output unit 290 outputs audio data decoded by the decoder 270 to an output apparatus not shown including a speaker.

The RTP division unit 220, the PS/TS converter 230, the clock controller 250, the clock generator 260, the decoder 270, the video-image output unit 280, and the audio output unit 290 described above correspond to electronic circuits, for example. Examples of the electronic circuits include an integration circuit such as an ASIC (Application Specific Integrated Circuit) or an FPGA (Field Programmable Gate Array), a CPU (Central Processing Unit), and/or an MPU (Micro Processing Unit).

[Configuration of PS/TS Converter in Second Embodiment]

Figure 5:
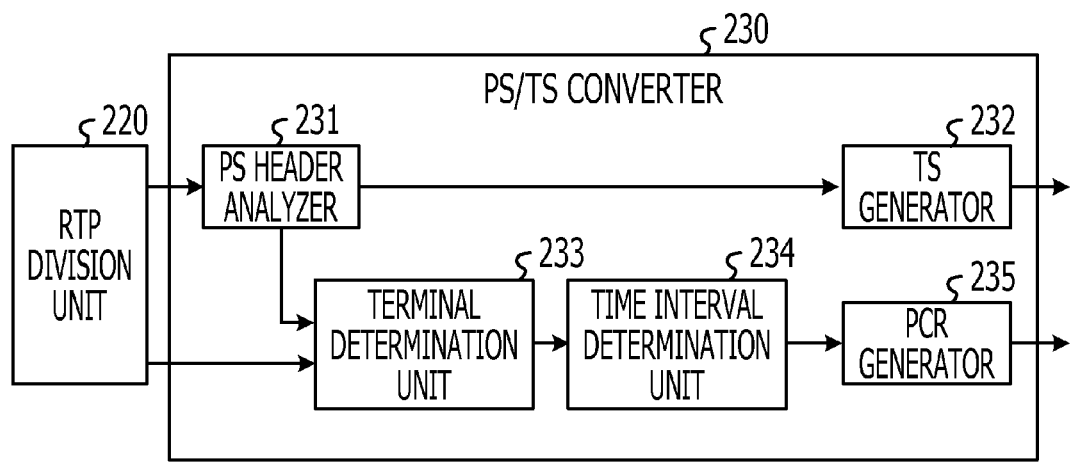
FIG. 5 is a block diagram illustrating a configuration of a PS/TS converter according to the second embodiment.

Referring next to FIG. 5, a configuration of the PS/TS converter 230 shown in FIG. 4 will be described. FIG. 5 is a block diagram illustrating the configuration of the PS/TS converter 230 according to the second embodiment. As shown in FIG. 5, the PS/TS converter 230 includes a PS header analyzer 231, a TS generator 232, a terminal determination unit 233, a time interval determination unit 234, and a PCR generator 235.

The header analyzer 231 analyzes a pack header of a PS pack supplied from the RTP division unit 220 so as to obtain an SCR stored in the pack header. Then, the header analyzer 231 outputs the obtained SCR to the terminal determination unit 233. Furthermore, the header analyzer 231 outputs a pack payload of the PS pack supplied from the RTP division unit 220 to the TS generator 232.

For example, when receiving the PS pack 11P shown in FIG. 3 supplied from the RTP division unit 220, the header analyzer 231 obtains the SCR stored in the pack header 11PH of the PS pack 11P and outputs the obtained SCR to the terminal determination unit 233. Furthermore, the header analyzer 231 outputs the pack payload 11PL of the PS pack 11P to the TS generator 232.

The TS generator 232 generates TS packets in accordance with the pack payload supplied from the header analyzer 231 and stores the generated TS packets in the buffer 240. For example, when receiving the pack payload 11PL of the PS pack 11P shown in FIG. 3, the TS generator 232 divides the pack payload 11PL into TS packets 12T to 14T.

The terminal determination unit 233 determines whether the SCR supplied from the header analyzer 231 corresponds to an SCR obtained from a terminal PS pack. Specifically, when receiving terminal information supplied from the RTP division unit 220, the terminal determination unit 233 determines that the SCR supplied from the header analyzer 231 corresponds to an SCR obtained from a terminal PS pack. Furthermore, when it is determined that the SCR supplied from the header analyzer 231 corresponds to an SCR obtained from a terminal PS pack, the terminal determination unit 233 outputs the SCR to the time interval determination unit 234. On the other hand, when it is determined that the SCR supplied from the header analyzer 231 does not correspond to an SCR obtained from a terminal PS pack, the terminal determination unit 233 does not output the SCR to the time interval determination unit 234.

For example, when outputting the PS packs 11P to 13P shown in FIG. 3 to the header analyzer 231, the RTP division unit 220 does not output terminal information to the terminal determination unit 233. In this case, the terminal determination unit 233 does not output SCRs of the PS packs 11P to 13P supplied from the header analyzer 231 to the time interval determination unit 234. On the other hand, when outputting the PS pack 14P shown in FIG. 3 to the header analyzer 231, the RTP division unit 220 outputs the terminal information to the terminal determination unit 233. In this case, the terminal determination unit 233 outputs an SCR of the PS pack 14P supplied from the header analyzer 231 to the time interval determination unit 234.

When receiving an SCR supplied from the terminal determination unit 233, the time interval determination unit 234 determines whether a difference between the SCR and a preceding SCR which has been processed is larger than a predetermined threshold value. When the determination is affirmative, the time interval determination unit 234 outputs the SCR supplied from the terminal determination unit 233 to the PCR generator 235. On the other hand, when the determination is negative, the time interval determination unit 234 does not output the SCR supplied from the terminal determination unit 233 to the PCR generator 235.

For example, the time interval determination unit 234 stores an SCR supplied from the terminal determination unit 233 in a predetermined storage unit. Thereafter, when receiving an SCR supplied from the terminal determination unit 233, the time interval determination unit 234 determines whether a difference between the SCR supplied from the terminal determination unit 233 and the preceding SCR which has been stored in the predetermined storage unit is larger than a predetermined threshold value. When the determination is affirmative, the time interval determination unit 234 replaces the SCR which has been stored in the predetermined storage unit by the SCR supplied from the terminal determination unit 233 and outputs the SCR to the PCR generator 235. On the other hand, when the determination is negative, the time interval determination unit 234 discards the SCR supplied from the terminal determination unit 233.

In this way, when receiving RTP packets with a time interval smaller than a predetermined threshold value, the reception apparatus 200 does not control the operation clock using all terminal PS packs but controls the operation clock using some of the terminal PS packs. Consequently, the reception apparatus 200 can reduce load applied to the operation-clock control process.

The PCR generator 235 generates a PCR in accordance with the SCR supplied from the time interval determination unit 234. Thereafter, the PCR generator 235 outputs a value of the generated PCR to the clock controller 250.

[Operation-Clock Control Process of Reception Apparatus in Second Embodiment]

Figure 6:
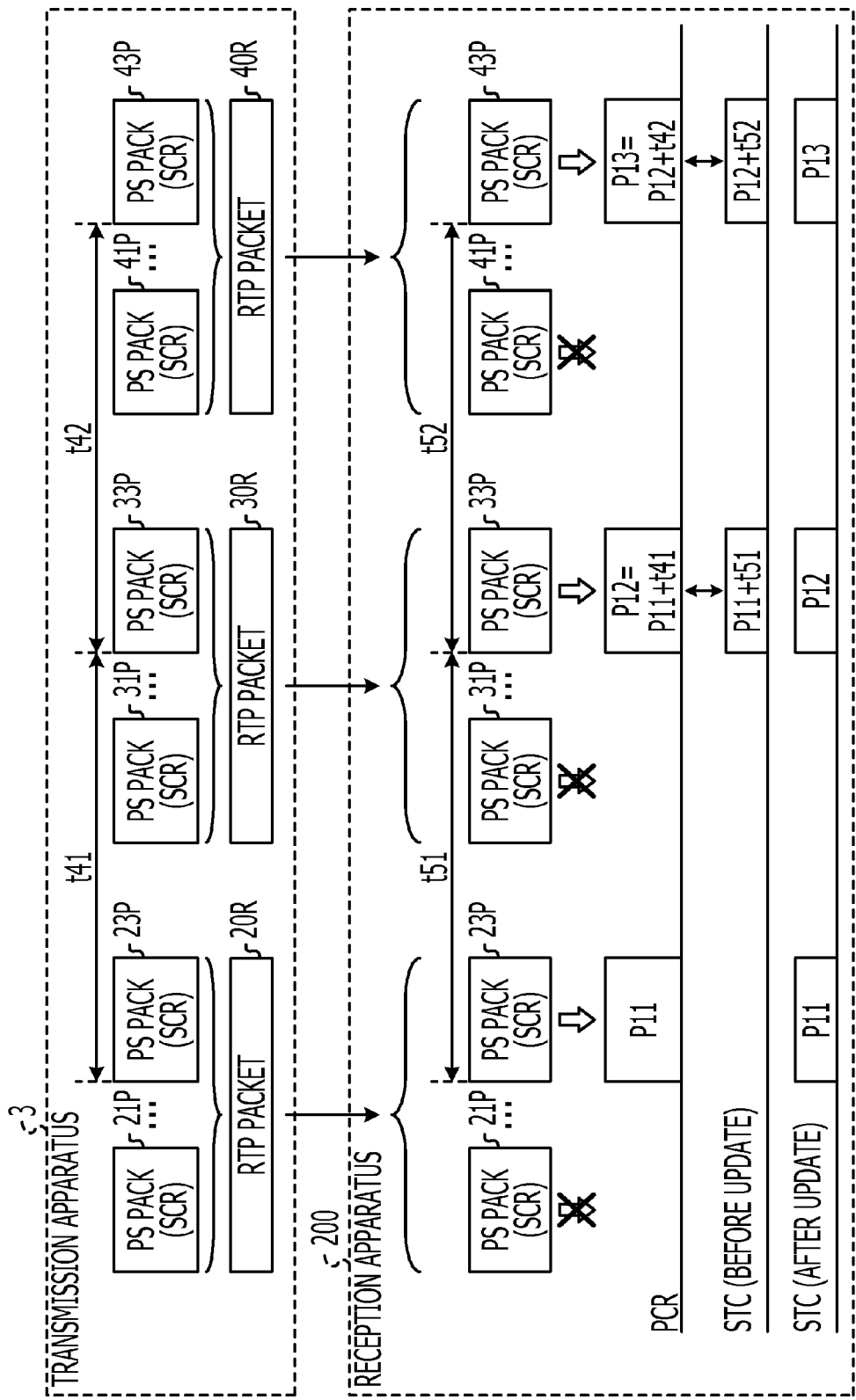
FIG. 6 is a diagram illustrating an operation-clock control process performed by the reception apparatus according to the second embodiment.

Referring now to FIG. 6, the operation-clock control process performed by the reception apparatus 200 according to the second embodiment will be described. FIG. 6 is a diagram illustrating the operation-clock control process performed by the reception apparatus 200 according to the second embodiment. It is assumed that, in FIG. 6, the time interval determination unit 234 determines that a difference between SCRs is larger than a predetermined threshold value.

In the example shown in FIG. 6, the transmission apparatus 3 transmits an RTP packet 20R including PS packs 21P to 23P to the reception apparatus 200. Thereafter, the transmission apparatus 3 transmits an RTP packet 30R including PS packs 31P to 33P, and then transmits an RTP packet 40R including PS packs 41P to 43P. Note that the PS pack 23P corresponds to a terminal PS pack of the RTP packet 20R, the PS pack 33P corresponds to a terminal PS pack of the RTP packet 30R, and the PS pack 43P corresponds to a terminal PS pack of the RTP packet 40R.

In this case, when the reception apparatus 200 according to the second embodiment receives the RTP packet 20R, the RTP division unit 220 divides the RTP packet 20R into the PS packs 21P to 23P. When the PS packs 21P and 22P are to be output to the PS/TS converter 230, the RTP division unit 220 does not output terminal information to the terminal determination unit 233. Accordingly, the terminal determination unit 233 does not output SCRs included in pack headers of the PS packs 21P and 22P to the time interval determination unit 234. Therefore, the PCR generator 235 does not generate PCRs in accordance with the SCRs stored in the pack headers included in the PS packs 21P and 22P.

On the other hand, when the PS pack 23P is to be output to the PS/TS converter 230, the RTP division unit 220 outputs terminal information to the terminal determination unit 233. Accordingly, the terminal determination unit 233 outputs an SCR stored in a pack header of the PS pack 23P to the time interval determination unit 234. Therefore, the PCR generator 235 generates a PCR in accordance with the SCR stored in the pack header included in the PS pack 23P. Note that the PCR generator 235 generates a PCR having a PCR value of P11. Then, the PCR which has the PCR value of P11 and which has been generated by the PCR generator 235 is output to the clock controller 250. The clock controller 250 sets the received PCR value of P11 as an STC of the reception apparatus 200.

Subsequently, when the reception apparatus 200 receives the RTP packet 30R, the RTP division unit 220 divides the RTP packet 30R into the PS packs 31P to 33P. As with the foregoing example, the PCR generator 235 does not generate PCRs in accordance with SCRs stored in pack headers of the PS packs 31P and 32P which do not correspond to terminal PS packs. On the other hand, the PCR generator 235 generates a PCR in accordance with an SCR stored in a pack header of the PS pack 33P. Note that the PCR generator 235 generates a PCR having a PCR value of P12.

Accordingly, the clock controller 250 compares the PCR value of P12 generated by the PCR generator 235 with the STC value of the reception apparatus 200. It is assumed that the transmission apparatus 3 generates the PS pack 33P after a period of time t41 has been elapsed after generating the PS pack 23P. That is, since the PCR value of P12 represents information on a time point when the transmission apparatus 3 generates the PS packet 33P, the PCR value P12 is obtained by the following expression: P11+t41. Furthermore, it is assumed that the PCR generator 235 generates the PCR from the PS pack 33P after a period of time t51 has been elapsed after generating the PCR from the PS pack 23P. That is, the clock controller 250 compares the PCR value of P12 generated by the PCR generator 235 with the PCT value P11+t51 of the reception apparatus 200.

The transmission apparatus 3 transmits the RTP packet 20R after generating the PS pack 23P serving as the terminal PS pack. Furthermore, the transmission apparatus 3 transmits the RTP packet 30R after generating the PS pack 33P serving as the terminal PS pack. That is, the transmission apparatus 3 is not brought into a waiting state but generates an RTP packet after generating the terminal PS pack, and transmits the generated RTP packet. Meanwhile, the reception apparatus 200 is not brought to a waiting state but generates a PCR when receiving the RTP packet. Accordingly, in the example shown in FIG. 6, when a clock speed of the transmission apparatus 3 is equal to a clock speed of the reception apparatus 200, the period of time t41 is substantially equal to the period of time t51. Accordingly, the reception apparatus 200 can properly compare an elapsed time in the transmission apparatus 3 with an elapsed time in the reception apparatus 200 so as to obtain the relationship therebetween.

Then, in the example shown in FIG. 6, when the PCR value of P12 is larger than the STC value as a result of the comparison, the clock controller 250 determines that the clock speed of the reception apparatus 200 is lower than that of the transmission apparatus 3 and controls the clock generator 260 so that the clock speed is increased. On the other hand, when the PCR value of P12 is smaller than the STC value, the clock controller 250 determines that the clock speed of the reception apparatus 200 is higher than that of the transmission apparatus 3 and controls the clock generator 260 so that the clock speed is reduced. Then, after the operation-clock control process is terminated, the clock controller 250 sets the PCR value of P12 as an STC of the reception apparatus 200.

Similarly, when receiving the RTP packet 40R, the reception apparatus 200 divides the RTP packet 40R into PS packs 41P to 43P. The PCR generator 235 generates a PCR in accordance with an SCR stored in the PS pack 43P serving as the terminal PS pack. It is assumed that the PCR generator 235 generates a PCR having a PCR value of P13 in this embodiment. Then, the clock controller 250 compares the PCR value of P13 with the STC value of the reception apparatus 200. It is assumed that the transmission apparatus 3 generates the PS pack 43P after a period of time t42 has been elapsed after the PS pack 33P is generated in this embodiment. Furthermore, it is assumed that the PCR generator 235 generates a PCR using the PS pack 43P after a period of time t52 is elapsed after a PCR is generated using the PS pack 33P. That is, the clock controller 250 compares the PCR value of P13 (=P12+t42) with an STC value of P12+t52 of the reception apparatus 200. Then, the clock controller 250 sets the PCR value of P13 as the STC of the reception apparatus 200 after the operation-clock control process is terminated.

[Procedure of Operation-Clock Control Process of Reception Apparatus in Second Embodiment]

Figure 7:
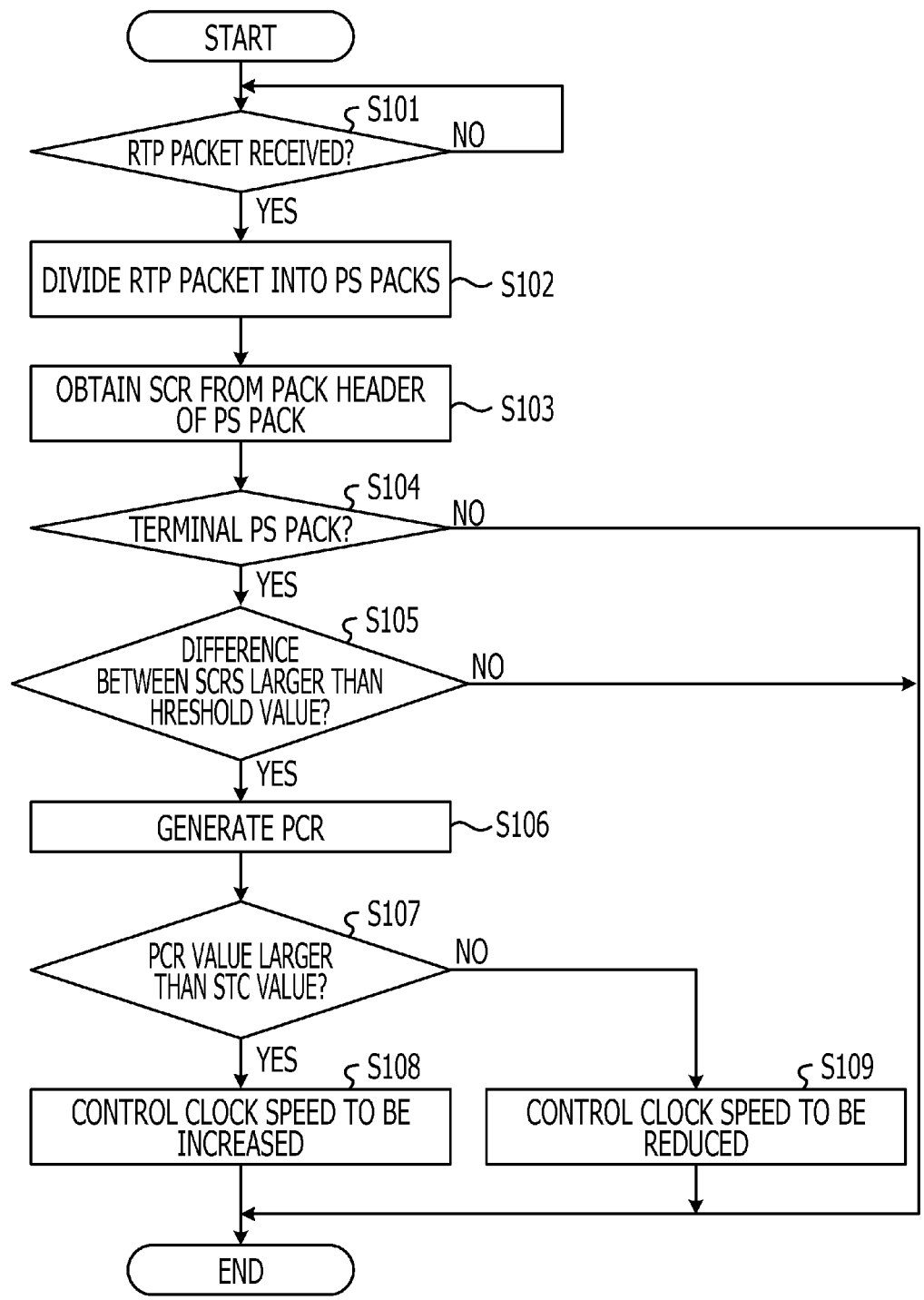
FIG. 7 is a flowchart illustrating a procedure of the operation-clock control process performed by the reception apparatus according to the second embodiment.

Referring now to FIG. 7, a procedure of the operation-clock control process performed by the reception apparatus 200 according to the second embodiment will be described. FIG. 7 is a flowchart illustrating the procedure of the operation-clock control process performed by the reception apparatus 200 according to the second embodiment.

As shown in FIG. 7, when receiving an RTP packet (when a determination is affirmative in S101), the reception apparatus 200 deletes an RTP header from the RTP packet and divides the RTP packet into PS packs in S102.

Subsequently, the header analyzer 231 analyzes a pack header of one of the PS packs supplied from the reception apparatus 200 so as to obtain an SCR stored in the pack header in S103.

Then, the terminal determination unit 233 determines whether the SCR supplied from the header analyzer 231 corresponds to an SCR obtained from one of the PS packs serving as a terminal PS pack in accordance with terminal information supplied from the RTP division unit 220 in S104.

When the terminal determination unit 233 determines that the SCR supplied from the header analyzer 231 corresponds to the SCR obtained from the terminal PS pack (when the determination is affirmative in S104), the time interval determination unit 234 compares the SCRs with each other. Specifically, the time interval determination unit 234 determines whether a difference between the SCR supplied from the terminal determination unit 233 and the preceding SCR which has been supplied from the terminal determination unit 233 is larger than a predetermined threshold value in S105.

When the time interval determination unit 234 determines that the difference between the SCRs is larger than the predetermined threshold value (when the determination is affirmative in S105), the PCR generator 235 generates a PCR in accordance with the SCR supplied from the terminal determination unit 233 in S106.

Subsequently, the clock controller 250 compares the PCR value generated by the PCR generator 235 with an STC value of the reception apparatus 200 in S107. As a result of the comparison, when the PCR value is larger than the STC value (when the determination is affirmative in S107), the clock controller 250 controls the clock generator 260 so that the clock speed is increased in S108. On the other hand, when the PCR value is smaller than the STC value (when the determination is negative in S107), the clock controller 250 controls the clock generator 260 so that the clock speed is reduced in S109.

Note that, when it is determined that the SCR supplied from the header analyzer 231 does not correspond to the SCR obtained from the terminal PS pack (when the determination is negative in S104), the PCR generator 235 does not generate a PCR. Then, the reception apparatus 200 terminates the operation-clock control process. Furthermore, when the time interval determination unit 234 determines that the difference between the SCRs is smaller than the predetermined threshold value (when the determination is negative in S105), the PCR generator 235 does not generate a PCR. Then, the reception apparatus 200 terminates the operation-clock control process.

Advantage of Second Embodiment

As described above, since the reception apparatus 200 according to the second embodiment compares the elapsed time of the transmission apparatus 3 with the elapsed time of the reception apparatus 200 using the terminal PS pack included in the RTP packet, the reception apparatus 200 can properly compare the elapsed times of both the apparatuses with each other so as to obtain the relationship therebetween. Accordingly, even when the reception apparatus 200 receives an RTP packet including a plurality of PS packs, the reception apparatus 200 can match the clock speed of itself with the clock speed of the transmission apparatus 3.

Furthermore, the reception apparatus 200 according to the second embodiment does not perform the operation-clock control process when a difference between an SCR used in a preceding operation-clock control process and an SCR of a process target currently received is not larger than a predetermined threshold value. Accordingly, when receiving an RTP packet after a time interval smaller than the predetermined threshold value, the reception apparatus 200 of the second embodiment can control the operation clock using some of the terminal PS packs. Consequently, in the reception apparatus 200 according to the second embodiment, load applied when the operation-clock control process is performed can be reduced.

Note that when a clock speed of a transmission apparatus is different from a clock speed of a reception apparatus, a processing speed of the reception apparatus is different from a processing speed of the transmission apparatus. For example, when a clock speed of a reception apparatus is lower than a clock speed of a transmission apparatus, the reception apparatus may exceed the capability to process an RTP packet supplied from the transmission apparatus. In this case, a buffer included in the reception apparatus may overflow. This causes a problem in that a moving image delivered from the transmission apparatus is not appropriately reproduced by the reception apparatus. In order to prevent the buffer from overflowing, a size of the buffer may be increased. However, this causes a problem in that cost is increased.

On the other hand, when the clock speed of the reception apparatus is higher than the clock speed of the transmission apparatus, for example, an RTP packet to be processed may not exist. In this case, a buffer included in the reception apparatus may be brought to an underflow state. In order to prevent the buffer from being brought to the underflow state, a process may be started after an RTP packet having a predetermined size or more is stored in the buffer. However, there arises a problem in that a moving image is not reproduced in real time.

Since the reception apparatus 200 according to the second embodiment can appropriately match the clock speed of itself with the clock speed of the transmission apparatus 3, the processing speed of the reception apparatus 200 matches the processing speed of the transmission apparatus 3. Therefore, in the reception apparatus 200 according to the second embodiment, the buffer 240 is not brought to an overflow state or an underflow state due to a difference between the processing speeds. Accordingly, the reception apparatus 200 according to the second embodiment can reproduce a moving image delivered from the transmission apparatus 3 in real time without increase of cost.

Note that, in the reception apparatus in the related art, when a difference between a PCR value generated in accordance with a PS pack received from the transmission apparatus and an STC value is larger than a predetermined value, a clock speed may not be controlled. However, even in the case where the reception apparatus 920 shown in FIG. 10 is employed, the reception apparatus 920 does not perform a clock-speed control process and the clock speed of the reception apparatus 920 is not matched with the clock speed of the transmission apparatus 910. In addition, in such a technique, when the difference between the PCR value and the STC value is smaller than the predetermined threshold value, the reception apparatus controls the clock speed of itself in accordance with information on a wrong result of the comparison.

Since the reception apparatus 200 according to the second embodiment can properly compare the elapsed time of the transmission apparatus 3 with the elapsed time of the reception apparatus 200 so as to obtain the relationship therebetween, the clock speed is controlled in accordance with a proper result of the comparison.

Furthermore, since the reception apparatus in the related art successively processes PS packs included in a received RTP packet, the clock-speed control process is performed in a short time. Accordingly, processing load is increased. However, since the reception apparatus 200 according to the second embodiment performs the clock-speed control process using a single terminal PS pack included in an RTP packet, processing load is reduced.

Third Embodiment

The reception apparatus, the reception method, and the reception program disclosed in this application may be carried out various other embodiments in addition to the embodiments described above. In a third embodiment, another embodiment of a reception apparatus, a reception method, and a reception program will be described in this application.

[Terminal PS Pack]

In the first and second embodiments, among PS packs included in an RTP packet, a PS packet having information on a time point which is nearest to a current time corresponds to a terminal PS pack, for example. However, each of the reception apparatuses 100 and 200 may determine that a PS pack which is stored last in the RTP packet corresponds to a terminal PS pack. This is because, in general, the transmission apparatus 3 stores a PS pack generated last in a last portion of an RTP packet. According to an aspect of an embodiment, a (one or more) packet(s) included in received data having a plurality of packets and which has information on a time point which is nearest to a time when the data was transmitted by a transmitting side can be referred to as a "terminal packet".

[System Configuration]

Furthermore, the components of the apparatuses shown in the drawings are functional concepts and may be physically arranged in a different way from the drawings. That is, concrete forms of distribution and integration of the apparatuses are not limited to those shown in the drawings, and all or some of the forms may be functionally or physically configured in a distribution manner or an integration manner in an arbitrary unit in accordance with various load or usage states. For example, the clock controller 250 and the clock generator 260 shown in FIG. 4 may be integrally configured as a processing unit.

[Program]

Furthermore, the various processes described in the foregoing embodiments can be realized by executing programs which have been prepared in advance by a computer such as a personal computer or a work station. Therefore, an example of a computer which executes a reception program having a function the same as that of the reception apparatus 100 shown in FIG. 1 will be described hereinafter with reference to FIG. 8.

Figure 8:
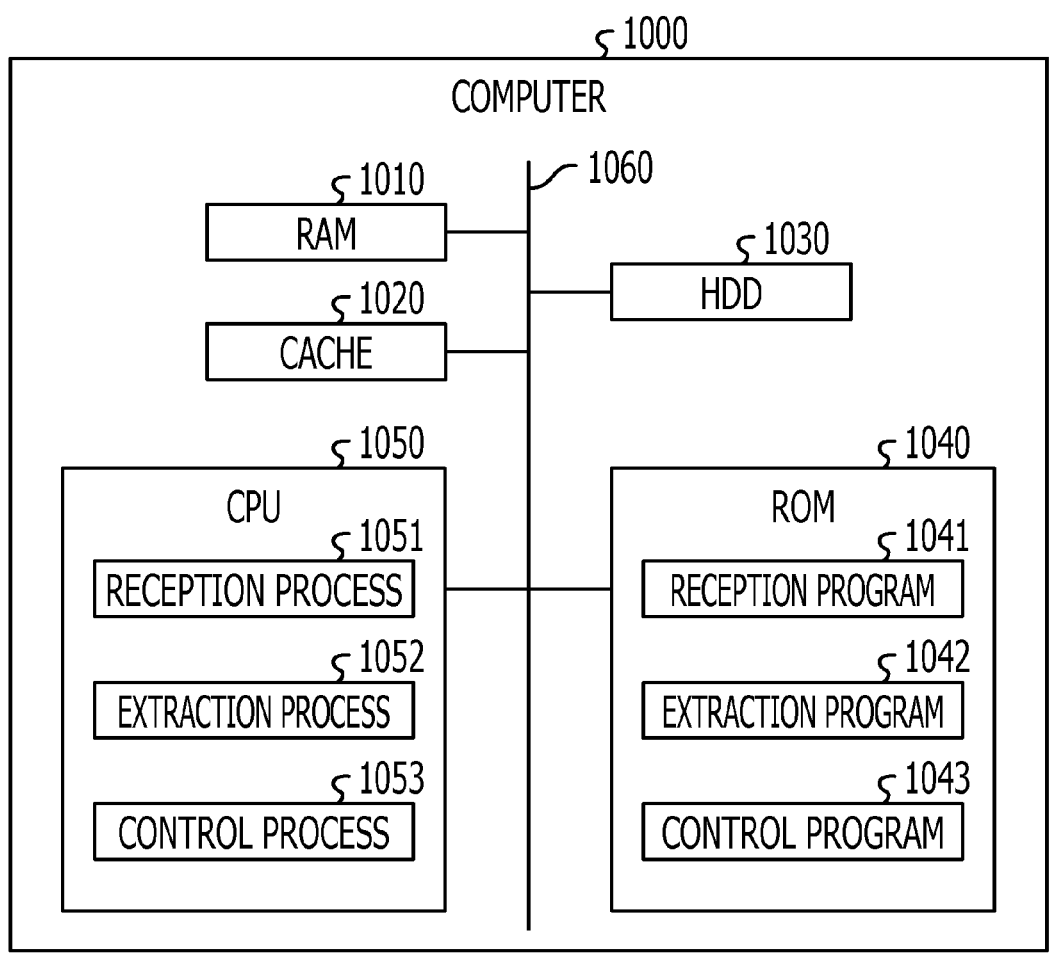
FIG. 8 is a diagram illustrating a computer which executes a reception program.

FIG. 8 is a diagram illustrating a computer 1000 which executes a reception program. As shown in FIG. 8, the computer 1000 includes computer-readable storage media, for example, a RAM (Random Access Memory) 1010, a cache 1020, an HDD 1030, a ROM (Read Only Memory) 1040, and a hardware computer processor (CPU) 1050, and a bus 1060. The RAM 1010, the cache 1020, the HDD 1030, the ROM 1040, and the CPU 1050 are connected to one another through the bus 1060. The computer-readable media can be a non-transitory or persistent computer-readable storage medium.

The ROM 1040 stores a reception program for providing a function the same as that of the reception apparatus 100 shown in FIG. 1 in advance. Specifically, the ROM 1040 stores a reception program 1041, an extraction program 1042, and a control program 1043.

The CPU 1050 reads and executes the reception program 1041, the extraction program 1042, and the control program 1043. By this, as shown in FIG. 8, the reception program 1041 functions as a reception process 1051, the extraction program 1042 functions as an extraction process 1052, and the control program 1043 functions as a control process 1053. Note that the reception process 1051 corresponds to the reception unit 110 shown in FIG. 1, the extraction process 1052 corresponds to the extraction unit 120 shown in FIG. 1, and the control process 1053 corresponds to the controller 130 shown in FIG. 1.

Note that it is not necessarily the case that the programs 1041 to 1043 described above are stored in the ROM 1040.

For example, the programs 1041 to 1043 may be stored in a portable physical medium such as a flexible disk (FD), a CD-ROM, an MO disc, a DVD disc, a magneto-optical disc, or an IC card. Alternatively, the programs 1041 to 1043 may be stored in a fixed physical medium such as a hard disk drive (HDD) provided inside or outside the computer 1000. Furthermore, the programs 1041 to 1043 may be stored in another computer (or a server) connected to the computer 1000 through a public line, the Internet, a LAN, or a WAN. Then, the computer 1000 may read each of the programs from a flexible disk or the like described above and execute the program.

According to an aspect of the embodiments of the invention, any combinations of one or more of the described features, functions, operations, and/or benefits can be provided. A combination can be one or a plurality. The embodiments can be implemented as an apparatus (a machine) that includes computing hardware (i.e., computing apparatus), such as (in a non-limiting example) any computer that can store, retrieve, process and/or output data and/or communicate (network) with other computers. According to an aspect of an embodiment, the described features, functions, operations, and/or benefits can be implemented by and/or use (be executed by) computing hardware (e.g., logic circuitry, etc.). In addition, an apparatus can include one or more apparatuses in computer network communication with each other or other apparatuses. In addition, a computer processor can include one or more computer processors in one or more apparatuses or any combinations of one or more computer processors and/or apparatuses. An aspect of an embodiment relates to causing one or more apparatuses and/or computer processors to execute the described operations. The results produced can be output to an output device, for example, displayed on the display.

The program/software implementing the embodiments may be transmitted over a transmission communication path, e.g., a wire and/or a wireless network implemented via hardware. An example of communication media via which the program/software may be sent includes, for example, a carrier-wave signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has (have) been described in detail, it should be understood that the various changes, substitutions, and alterations could be made hereto without departing from the spirit and scope of the invention.

What is claimed is:

1. A reception apparatus comprising:
   a processor; and
   a memory which stores a plurality of instructions, which when executed by the processor, cause the processor to execute;
       receiving data including a plurality of packets each of which has information on a time point when the packet is generated;
       extracting a terminal packet, which is one of the packets included in the received data and which has information on a time point which is nearest to a current time point; and
       controlling an operation clock speed by comparing the information on the time point included in the terminal packet with information on an elapsed time obtained by adding information on a time point, which is included in a terminal packet of preceding data, to an elapsed time from when the preceding data is received to the current time point.

2. The reception apparatus according to claim 1, wherein, when a difference between the information on the time point included in the terminal packet and the information on the time point included in the terminal packet of the preceding data is larger than a predetermined threshold value, the controlling compares the information on the time point included in the terminal packet with the information on the elapsed time to thereby control an operation clock.

3. The reception apparatus according to claim 1, wherein the controlling the operation clock speed includes:
   increasing the operation clock speed when the time point included in the terminal packet is larger than the elapsed time; and
   reducing the operation clock speed when the time point included in the terminal packet is smaller than the elapsed time.

4. A data reception method of a reception apparatus, the reception method comprising:
   receiving data including a plurality of packets each of which has information on a time point when the packet is generated;
   extracting a terminal packet which is one of the packets included in the data received in the reception and which has information on a time point which is nearest to a current point; and
   controlling an operation clock speed by comparing the information on the time point included in the terminal packet extracted in the extraction with information on an elapsed time obtained by adding information on a time point included in a terminal packet of preceding data to an elapsed time of the reception apparatus from when the preceding data is received to the current time point.

5. A non-transitory computer-readable storage medium including a program to cause a data reception apparatus to execute operations comprising:
   receiving data including a plurality of packets each of which has information on a time point when the packet is generated;
   extracting a terminal packet which is one of the packets included in the received data and which has information on a time point which is nearest to a current time point; and
   controlling an operation clock speed by comparing the information on the time point included in the terminal packet with information on an elapsed time obtained by adding information on a time point, which is included in a terminal packet of preceding data, to an elapsed time from when the preceding data is received to the current time point.

6. The reception apparatus according to claim 1, wherein the current time point is represented by the System Clock Reference.

7. The reception apparatus according to claim 1, wherein the current time point is represented by a counter value of 42 bits operated in 27 MHz.

* * * * *